May 26, 1970    A. V. KOWALCZYK    3,514,028
APPARATUS FOR MANUFACTURING PIN BOARDS
Filed Oct. 11, 1965    2 Sheets-Sheet 2
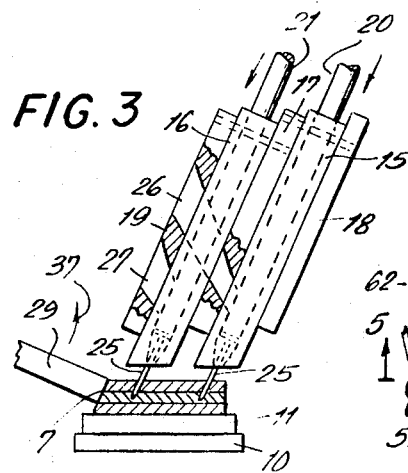
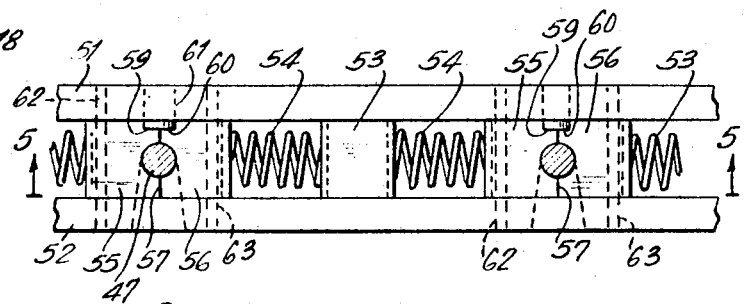
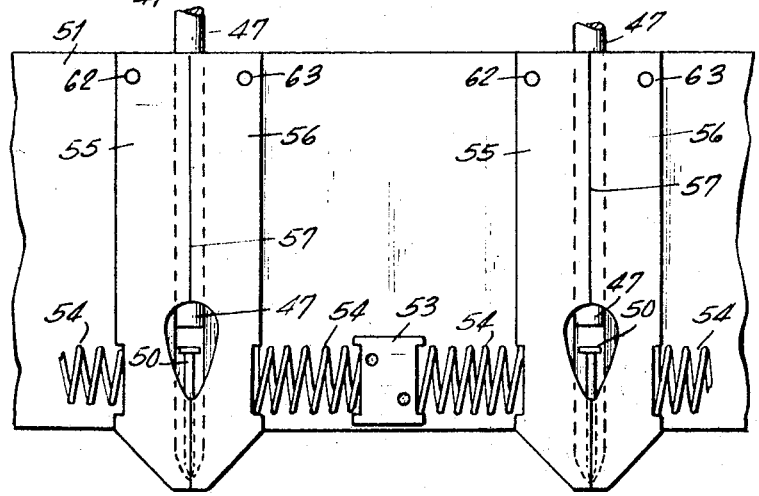
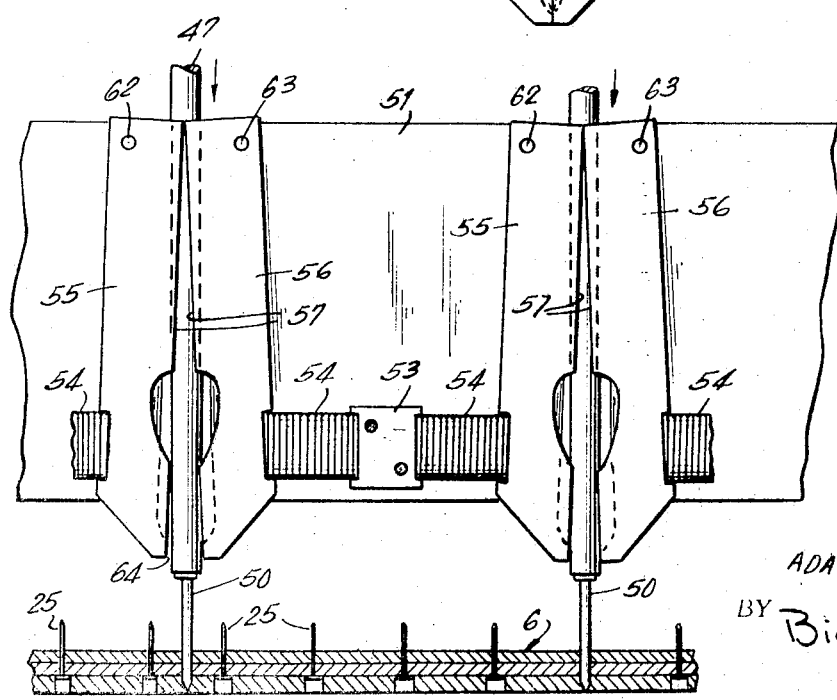
INVENTOR.
ADAM V. KOWALCZYK,
BY Bierman + Bierman
ATTORNEYS

# United States Patent Office 3,514,028
Patented May 26, 1970

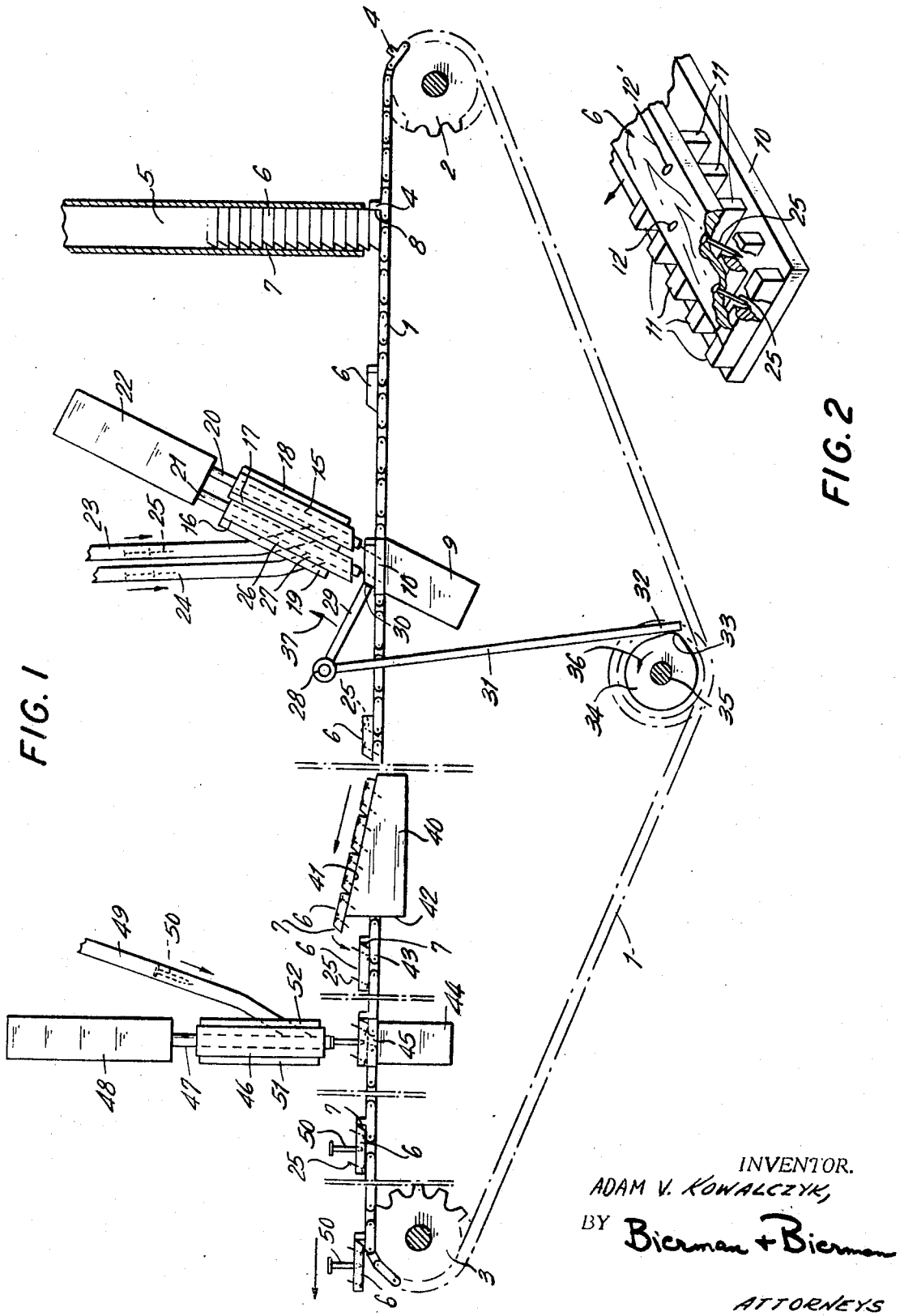

3,514,028
APPARATUS FOR MANUFACTURING
PIN BOARDS
Adam V. Kowalczyk, 456 W. 35th St.,
New York, N.Y. 10001
Filed Oct. 11, 1965, Ser. No. 494,467
Int. Cl. B25c 5/00
U.S. Cl. 227—99                16 Claims

ABSTRACT OF THE DISCLOSURE

Method and apparatus for manufacture of carpet tacking board comprising an endless belt conveyor for the raw board, a feeding station for introducing the board onto the conveyor, a pin inserting station wherein a plurality of rams, inclined to the vertical, drive pins until their upper ends are flush with the top of the boards, means for reversing the boards, and means for driving nails in the board so that the points thereof do not extend beyond the board.

---

The present invention is directed to making tackless strips or pin boards such as are currently used in the laying of carpets in order to hold such carpets in place, and more particularly to a tackless strip-making machine or mechanism.

While some mechanism has been used to accomplish this result, it was not sufficient for commercial production on an economical scale. These boards are usually about ¼ inch to about 1¼₆ inches wide and 48 inches long. In prior devices, the board, in order to put in place the necessary pins, was tilted and the pins were driven into the board vertically. There was much hand labor involved in the various steps necessary to make a complete board, containing not only the pins but also nails for attaching said board to the floor. Many operations were necessary in order to accomplish the desired purpose and the mechanism operated quite slowly so that the production from a machine was relatively small.

The present invention is intended and adapted to overcome the difficulties and disadvantages inherent in prior methods and devices for making pin boards, it being among the objects of the invention to provide a mechanism which is substantially automatic and which requires only a minimum of labor.

It is also among the objects of the invention to provide a mechanism which is simple in construction and which may be operated at a relatively slow speed and produce a large number of finished units in a very short time.

In practicing the invention, there is provided an endless conveyor on which the strips of wood constituting the finished product is caused to travel in a direction transversely of its length. The board travels horizontally into a first station where pins for the entire board are driven simultaneously at an angle into and through the strip. Then the board travels to a second station where the boards having the pins therein are reversed or flipped over with the points of the pins extending upwardly. Then at a third station nails are driven vertically into the board but not through the same.

The invention is more fully described in connection with the accompanying drawings constituting a part hereof and in which like reference characters indicate like parts, and in which FIG. 1 is a side elevational view of an apparatus made in accordance with the present invention, the showing being diagrammatic;

FIG. 2 is a fragmentary perspective view of a support for the boards located at the first station;

FIG. 3 is a side elevational view of the mechanism at the first station somewhat enlarged;

FIG. 4 is a fragmentary enlarged front elevational view of the mechanism at the third station for introducing nails into the boards;

FIG. 5 is a top plan view of FIG. 4; and

FIG. 6 is a view similar to FIG. 4 showing the device in a later stage of operation.

Referring to the drawings, the endless conveyor 1 operates between end sprockets 2 and 3. At intervals somewhat greater than the width of a strip, ribs 4 are attached to links of the endless chain. At the entrance of the mechanism is a vertical hopper 5 adapted to hold a stack of strips or boards 6, the front faces 7 of which are beveled. As the boards are fed on the conveyor they abut at 8 on ribs 4 and thus are carried along to the left.

The strips pass to a support 9 having a plate 10 fixed thereon. As shown in FIG. 2, narrow slats 11 are attached to the top side of plate 10 spaced apart a sufficient distance so that the points 12 of the pins pass between the individual slats. The heads 12' are flush with the upper surface of the board.

Refering to FIG. 4 there are provided hollow members 15 and 16 which are open centrally and are held apart by a spacer 17. Covers 18 and 19 form a complete unit. Means are provided for feeding pins 25 into hollow members 15 and 16 containing punches 20 and 21 which are operated by ram 22 extending across the length of the strips. Tubes 23 and 24 have pins 25 therein fed from a conventional nail hopper, all of said pins having the points or tips facing downward. They enter the unit through openings 26 and 27 where the operation of the ram will simultaneously force a complete set of pins over the entire width of the board, into and through the same and flush with the top of the board. Slats 11 allow the pin tips to penetrate beyond the lower face of the board and limit the danger of splintering the board.

In order to hold the boards firmly in place through this operation there is provided a plate 29 pivoted at 28 and constituting a backstop. A lever 31 in fixed relation to plate 29 has its free end in contact with lobe 33 constituting a cam follower. The lobe is mounted on disc 34 pivoted at 35 and operated by means (not shown) in the direction of arrow 36, causing plate 29 to move in the direction of arrow 37 to release the end 30 thereof from face 7 of the board.

Upon the release of the board from the first station it travels up an inclined plane 40 being guided by the upper face 41 thereof. When a board reaches vertical end 42 it automatically drops over and reverses its position as shown at 43. The board then travels to the third station 44 which has a block 45 thereon constituting an anvil. In hollow members 46 there are nail punches 47 operated by a ram 48 across the length of the strip. There are provided tubes 49 for the nails 50 and the lower ends of said tubes have openings into the hollow cylindrical members 46. Covers 51 and 52 are provided for cylinders 46 to properly aline the nails.

Between covers 51 and 52, anchored thereon, are blocks 53 placed between adjacent members to be described. Each of such blocks have coil springs 54 held in recesses therein, the other ends of said springs being held in recesses in adjacent members. Each of these members consists of a pair of jaws 55 and 56 having a cylindrical opening at the junction 57 thereof. Recesses 58 in the outer faces of the jaws retain springs 54.

As best shown in FIG. 5, recesses 59 and 60 are formed in one face of jaws 55 and 56 and a plug 61 fixed in cover 51 projects into space 59–60. Each of the jaws is pivoted as shown at 62 and 63 so that when nails are forced into the boards by punches 47, the lower end of the jaws will open as shown in FIG. 6 to allow the heads of the nails to pass out of the jaws at 64 plug 61 acts as a centering plug to prevent said nails and punches 47 from moving out of the desired position.

In the operation of the mechanism it is quite apparent that as the conveyor moves from right to left and stops at each station momentarily, suitable operations take place with the boards in various stages of completion. Since operations at all three stations take place simultaneously, the loss of time by the periodic stopping of the conveyor consumes only a small fraction of the time necessary to make a complete pin-board. The movements of the conveyor, at the stations, the stopping and the starting up again are coordinated with the movements of the two rams so that all operations are in synchronism.

There are a number of advantages inherent in the present invention over prior mechanisms intended to accomplish the same purpose. For instance, it was quite common in the prior art that in driving nails or pins into the wood splitting would take place. In the present invention, because of the adequate support given to the boards such accidents do not occur. In the prior mechanisms they generally produced a maximum of nine strips per minute whereas with the present mechanism at least 75 such strips per minute can be made.

In the present invention, because of the provision of jaws between which nails or pins are fed simultaneously all along the length of the pin-board, the production is very rapid. In the first operation, the jaws are placed at an angle to the horizontal; this keeps the pins perfectly alined throughout the length of the pin-board. The pin setting and nail setting jaws open in a linear direction relative to said board, further aiding the accuracy of placement of the pins and nails. Because of these and other features of applicant's mechanism the boards are fed into the machine at quite close intervals. This makes for a compact machine which operates at slow speed, with large production, and the products are practically perfect without exception, being identical in nail depth, nail alinement, and pin depth and pin alinement.

Wherever reference is made herein to board or wood, it is understood that other materials may be substituted, as for example, plastic.

These and other changes may be made in the specific embodiments of the invention without departing from the scope and spirit thereof. This invention is to be broadly construed and not to be limited except by the character of the claims appended hereto.

What is claimed is:

1. A machine for making pin-boards for rugs comprising means for conveying a strip of wood, having a face across which its width may be measured, transversely of its length with said face in a substantially horizontal position, a ram for forcing pins into and through said strip while in said horizontal position, said ram being at an acute angle to the face of said strip, a backstop holding said strip against movement while said ram is in action.

2. A machine according to claim 1 characterized in that there are means for feeding said pins under said ram.

3. A machine according to claim 1 characterized in that said strips rest on a support while said ram is in action.

4. A machine according to claim 1 characterized in that said backstop includes a pivoted plate, the free end of which is in contact with said strip while said ram is in action.

5. A machine according to claim 1 characterized in that said strips rest on a plate having spaced blocks thereon, the spacing being such that said pins project between said blocks.

6. A machine according to claim 1 characterized in that said backstop includes a pivoted arm, the free end of which is in contact with said strip while said ram is in action, and a cam and follower operatively connected to said backstop to synchronously be inserted and removed from stopping position with said ram.

7. A machine according to claim 1 characterized in that said strips are moved over an inclined plane and are dropped therefrom onto said conveying means in reversed position.

8. A machine according to claim 1 characterized in that there is a machine base over which said strip is adapted to pass, an anvil on said base, means for feeding nails to said strips, and means for punching said nails through said strips to contact with said anvil.

9. A machine according to claim 1 characterized in that there is a machine base over which said strip is adapted to pass, an anvil on said base, means for feeding nails to said strips, and means for punching said nails through said strips to contact with said anvil, said means including punches contacting said nails and rams for forcing said nails into said strips.

10. A machine according to claim 1 characterized in that there are holders for nails or pins each holder being split longitudinally and adapted to hold said nails between the parts of said holders.

11. A machine according to claim 10 characterized in that said parts are pivoted at their upper ends and are adapted to spread at the lower ends to release nail heads.

12. A machine according to claim 10 characterized in that said parts are pivoted at their upper ends and are adapted to spread at the lower ends to release nail heads, and lateral springs contacting said parts to bias said parts together.

13. A machine according to claim 10 characterized in that said parts are pivoted at their upper ends and are adapted to spread at the lower ends to release nail heads, and lateral springs contacting said parts to bias said parts together, a centering plug extending into said holder at the junction of said parts to maintain said nails in predetermined relation.

14. A machine for making pin-boards for rugs comprising a substantially horizontal conveyor, a first station having means for forcing pins at an angle through said boards, a second station for overturning said boards containing said pins, and a third station having means for forcing nails into said boards but not beyond the face thereof.

15. A machine according to claim 14 characterized in that said boards are elongated and they are conveyed at about right angles to their long dimensions.

16. A machine according to claim 1 wherein there is provided at least one upstanding rib on said means for conveying against which said strips abut.

References Cited
UNITED STATES PATENTS

| | | | |
|---|---|---|---|
| 1,399,799 | 12/1921 | Rowe | 227—149 X |
| 2,240,516 | 5/1941 | Paxton | 227—149 |
| 2,669,714 | 2/1954 | Newcomb et al. | |
| 2,950,480 | 8/1960 | Sower. | |
| 2,953,788 | 9/1960 | Maex et al. | 227—104 X |
| 3,112,488 | 12/1963 | Detloff et al. | |
| 3,306,511 | 2/1967 | Small | 227—80 X |

CHARLIE T. MOON, Primary Examiner

C. E. HALL, Assistant Examiner

U.S. Cl. X.R.

29—432; 227—149, 151